United States Patent [19]

Wu et al.

[11] Patent Number: 5,440,424
[45] Date of Patent: Aug. 8, 1995

[54] PRISM OPTICAL DEVICE AND POLARIZING OPTICAL DEVICE

[75] Inventors: Jin-Jei Wu; Shoichi Uchiyama; Yoshitaka Itoh; Tomio Sonehara, all of Suwa, Japan

[73] Assignee: Seiko Epson, Tokyo, Japan

[21] Appl. No.: 20,268

[22] Filed: Feb. 18, 1993

Related U.S. Application Data

[63] Continuation of Ser. No. 755,703, Sep. 6, 1991, abandoned.

[30] Foreign Application Priority Data

Sep. 6, 1990 [JP] Japan ................... 2-236448

[51] Int. Cl.$^6$ .................... G02B 5/30; G02B 27/28
[52] U.S. Cl. ................... 359/495; 359/496; 359/497
[58] Field of Search ............ 359/487, 488, 494, 495, 359/496, 497, 484

[56] References Cited

U.S. PATENT DOCUMENTS

| | | | |
|---|---|---|---|
| 2,262,524 | 11/1941 | Ball | 359/496 |
| 3,274,881 | 9/1966 | Sauer | 359/496 |
| 3,401,590 | 9/1968 | Massey | 359/496 |
| 3,511,556 | 5/1970 | Ammann . | |
| 3,552,823 | 1/1971 | Badoz et al. | 359/496 |
| 3,565,508 | 2/1971 | Dumont | 359/496 |
| 3,572,895 | 3/1971 | Schmidt et al. | 359/496 |
| 3,689,163 | 9/1972 | Glorioso | 359/496 |
| 3,720,457 | 3/1973 | Swartz et al. | 359/495 |
| 3,868,168 | 2/1975 | De Veer | 359/495 |
| 3,876,285 | 4/1975 | Schwarzmuller | 359/495 |
| 3,902,782 | 9/1975 | Forman et al. | 359/496 |
| 3,914,018 | 10/1975 | DeShazer . | |
| 3,998,524 | 12/1976 | Hobby, Jr. et al. | 359/496 |
| 4,198,123 | 4/1980 | Kremen | 359/496 |
| 4,964,707 | 10/1990 | Hayashi | 359/496 |
| 5,078,482 | 1/1992 | Feldman et al. | 359/496 |

FOREIGN PATENT DOCUMENTS

| | | | |
|---|---|---|---|
| 0040033 | 11/1981 | European Pat. Off. . | |
| 0152212 | 11/1981 | Germany . | |
| 55-103518 | 8/1980 | Japan | 359/496 |
| 57-54906 | 4/1982 | Japan | 359/496 |
| 57-161721 | 10/1982 | Japan | 359/496 |
| 59-228610 | 12/1984 | Japan | 359/496 |
| 63-80222 | 4/1988 | Japan | 359/496 |
| 2087584 | 5/1982 | United Kingdom | 359/496 |

OTHER PUBLICATIONS

Schmidt et al, "Temperature Stabilization of the Deflection Pattern of Digital Light Deflector Containing Single Prisms," vol. 2, No. 1, Feb., 1970, pp. 29 to 35.
"System for Stepless Beam Splitting," *IBM Technical Disclosure Bulletin*, vol. 30, No. 11, Apr. 1988, pp. 249 to 250.

*Primary Examiner*—Martin Lerner
*Attorney, Agent, or Firm*—Stroock & Stroock & Lavan

[57] ABSTRACT

A polarizer optical device for receiving and transmitting light is provided. The polarizer optical device includes a light separating section for separating the light into two polarization components which are othogonal with respect to one another. Further, the optical device is provided with a polarization rotating section for rotating the two polarization components so that a phase difference between the two polarization components othogonal to each other is ½λ. Finally, a light combining section is provided for combining the light into a outputted light beam. The light combining section may be formed with a combination of birefringent prisms and isotropic mediums interfacing one another. In these configurations, the refractive index of each prism or medium is selected so that an angle formed with two unparallel incident lights differs from an angle formed with two output or transmitted lights. The two unparallel incident lights and the two output lights travel on a plane surface which is vertical with respect to the interface surface between the two prisms.

7 Claims, 5 Drawing Sheets

PRISM OPTICAL DEVICE AND POLARIZING OPTICAL DEVICE

This is a continuation application of Application Ser. No. 07/755,703, filed Sep. 6, 1991, now abandoned.

BACKGROUND OF THE INVENTION

The present invention relates generally to polarizers and, in particular, to a polarizer employing an optical device which is formed with a combination of birefringent prisms and isotropic mediums to improve transmittance of light rays. The invention can be used in connection with liquid crystal displays, laser optical devices and the like.

There are three types of conventional linear polarizers that are commonly used: (a) absorption type, (b) reflection type, and (c) refraction type. The absorption type polarizer, (e.g., a dichroic sheet polarizer) absorbs one component of an unpolarized light and transmits the component normal thereto. The reflection type (e.g., a polarizing beam splitter) reflects one component of an unpolarized light and transmits the component normal thereto. The refraction type (e.g., a light displacing prism) refracts one component of unpolarized light and transmits the component normal thereto. In these polarizers, at least half of the unpolarized light energy is absorbed, reflected or refracted. Accordingly, the remaining intensity transmitted through the polarizer is less than 50% of the incident light intensity originally received by the polarizer.

In order to improve the transmittance of a conventional polarizer, the inventors of the present application suggest, in JP Application No. 327608/89, the application of a sheet preliminary polarizer as shown in FIG. 1 of the drawings. This preliminary polarizer is formed with two sections: a light separating section 100 and a polarization rotating section 101. Unpolarized incident light 102 is first transmitted to light separating section 100. Unpolarized incident light 102 is formed with two components: a perpendicular polarizing direction 103 with respect to the paper (the first component) and a horizontal polarizing direction 104 with respect to the paper (the second component).

Unpolarized incident light 102 is transmitted to light separating section 100 through a first crystal 109 having an optical axis 109' then to a second crystal 110 having an optical axis 110'. Unpolarized incident light 102 is divided into two beams at the interface of the two edge prisms 109 and 110. Unpolarized incident light 102 then travels as two beams through polarizing rotating section 101. A first beam 105 formed by first component 103 is transmitted light having a polarizing direction rotated 90° in polarizing rotating section 101 and has a horizontal polarizing direction 107 with respect to the paper. A second beam 106 formed by second component 104 is transmitted having a polarization direction 108 parallel to the paper.

In this embodiment, the sheet preliminary polarizer has high transparency and perfectly polarizes unpolarized light. In the case of a normally incident monochromatic light, more than 50% of the incident light is transmitted through the sheet of a preliminary polarizer which is better than a conventional polarizer.

However, the preliminary polarizer disclosed in JP Application No. 327608/89 also has problems. The incident light transmitted through the sheet preliminary polarizer is divided into two light rays having a very small separation angle. Therefore, when an observer watches an object through the sheet preliminary polarizer, two overlapped images are viewed.

It is therefore desirable to provide a polarizer having a combination of birefringent prisms and isotropic mediums to form a section for adjusting two light rays in the same direction. The light ray combining section should have high transmittance so that the transmittance after passing through the polarizer is much greater than a conventional polarizer.

SUMMARY OF THE INVENTION

Generally speaking, in accordance with the present invention, a polarizer optical device for receiving and controlling the path of incident light is provided. The polarizer optical device includes a light separating section for separating the incident light into two polarizing components which are orthogonal with respect to one another. The polarizer optical device is further provided with a polarization rotating section for rotating one of the two polarization components by 90°. Further, the polarizer optical device is provided with a light combining section for combining the incident light into an outputted light beam.

In one embodiment of the invention, the light combining section includes one birefringent edge prism having a refractive index specific to the birefringent edge prism. In addition, the light combining section is provided with at least one isotropic edge prism having a refractive index specific to the isotropic edge prism interfacing with the birefringent prism. In this manner, the refractive index of each prism is adjusted so that an angle formed with two incident light rays differs from the angle formed from the two output lights. Accordingly, the two unparallel incident lights and the two output lights travel on a plane surface which is vertical with respect to the interface surface between the edge prisms.

In another embodiment, the light combining section includes at least two birefringent end prisms having a crystal optical device axis on the same plane and a refractive index specific to the birefringent edge prisms. In this configuration, the birefringent edge prisms interface with respect to one another. The refractive index of each prism is adjusted so that an angle formed with the incident light rays differs from an angle formed with the two output lights. Accordingly, the two unparallel incident lights and the two output lights travel on a plane surface which is vertical with respect to the interface surface between the birefringent edge prisms.

Accordingly, it is an object of the invention to provide an improved optical device which is formed with a combination of birefringent prisms and isotropic mediums to improve the transmittance of light rays.

Another object of the invention is to provide an optical device where light energy can be economized such that the absorption of light energy is small and therefore can be ignored.

A further object of the invention is to provide an optical device having an inter-layer refractive index which can be adjusted in the designing process so that the reflective coefficient is very small.

Still other objects and advantages of the invention will in part be obvious and in part be apparent from the specification.

The invention accordingly comprises a product possessing the features, properties, and the relation of components which will be exemplified in the product hereinafter described, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 5 (b) is a sectional view of a polarization rotating section for receiving the transmitted light from the light separating section of FIG. 5(a)

DETAILED DESCRIPTION OF THE PREFERRED EMBODIMENTS

Figure 2:
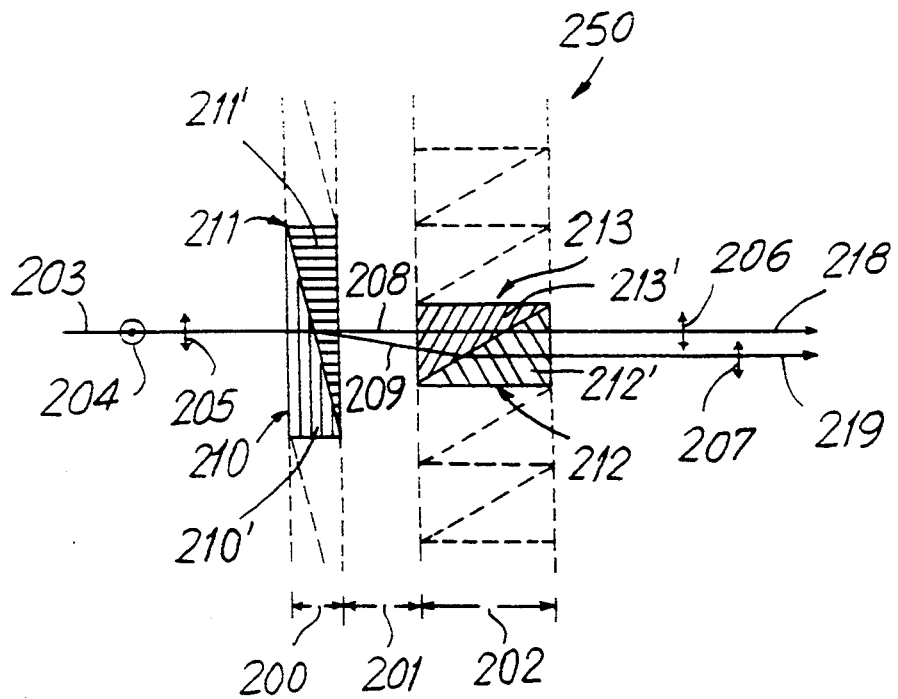
FIG. 2 is a sectional view of a polarizer formed from a multi-layered optical device having birefringent prisms in accordance with the present invention.

A preliminary polarizer 250 constructed in accordance with the invention is shown in FIG. 2. Polarizer 250 is formed with multi-layered optical devices comprising highly birefringent prisms. The multi-layers can be separated into three sections according to their functions. The first section is a light separating section 200 for separating the light into an ordinary ray and an extraordinary ray. The second section is a polarization rotating section 201 for rotating the extraordinary ray by 90° in the ordinary ray region. The third section is a light ray combining section 202 for combining the two light rays.

In FIG. 2, unpolarized light 203 is incident in the normal direction. Unpolarized light 203 is represented by the combination of two light ray components. A first component 204 is the perpendicularly polarized light component. A second component 205 is the horizontally polarized light component with respect to the paper of FIG. 2. Unpolarized incident light 203 is directed to prism 210 having an optical axis 210' and prism 211 having optical axis 211'. In this manner, unpolarized incident light 203 is divided into two beams at the interface of the two edge prisms. A first beam 208 is formed from first component 203 and is defined as the ordinary light. A second beam 209 is formed from second component 205 and is defined as the extraordinary light. First beam 208 and second beam 209 are then transmitted through prism 213 having an optical axis 213' and prism 212 having the optical axis 212' and are outputted again as two separate rays.

In this manner, first beam 208 is transmitted light having a polarized direction rotated 90° represented by a light beam 218 having a perpendicular polarizing direction 206 with respect to the paper. Second beam 219 is transmitted through the prisms forming transmitted light slightly shifted in the parallel direction of light beam 208 forming a light beam 219. Further, light beam 219 has a perpendicular polarizing direction 207 with respect to the paper.

Accordingly, if the size of each element is so small that it is not recognized by the observer, then the parallax generated by the object placed behind the preliminary polarizer is also small. Therefore, the observer can not identify the difference of the two beams. Consequently, the image of the object observed behind the preliminary polarizer is clear and vivid.

Figure 3A:
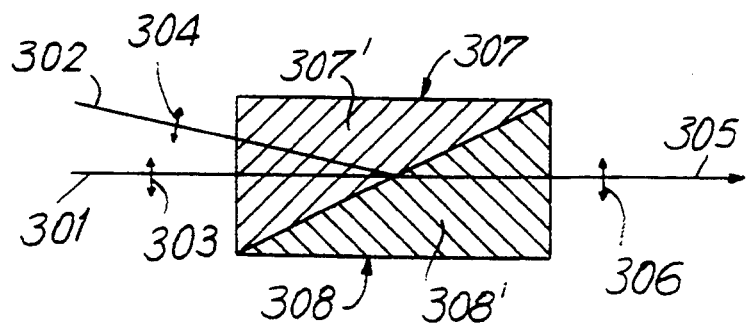
FIGS. 3(a), (b), (c), (d), (e), and (f) are cross-sectional views of a light ray combining section in accordance with the invention.
Figure 3B:
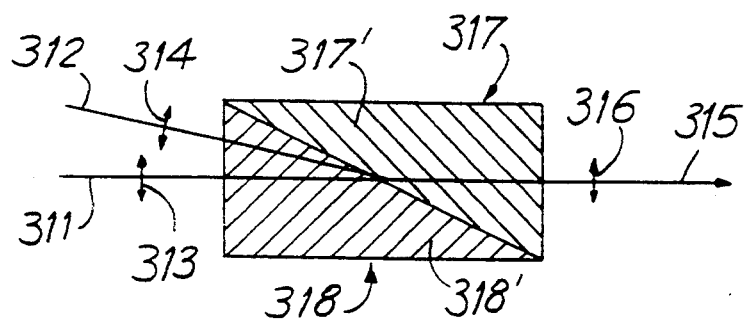
Figure 3C:
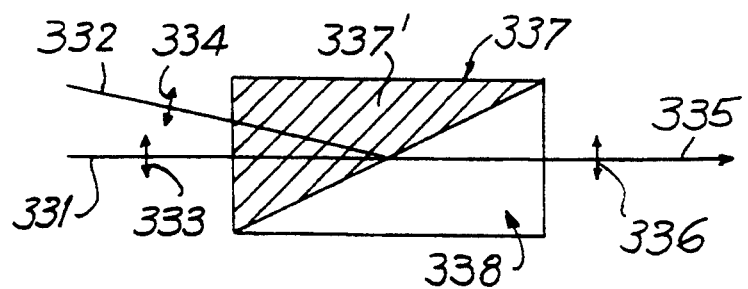

Reference is now made to FIGS. 3(a)-(f) which disclose light ray combining section 202 of FIG. 2 having two edge-shaped prisms. In FIGS. 3(a) and (b), the optical axis directions of the crystal of the two prisms are opposed to each other. In FIG. 3(a), an optical axis 307' of crystal 307 is opposed to an optical axis 308' of crystal 308. In FIG. 3(b), an optical axis 317' of crystal 317 is opposed to an optical axis 318' of crystal 318. Under the influence of the birefringent characteristics of the crystal, an oblique incident light ray 302 and a light ray 301 incident in the perpendicular direction to crystal 307 are clearly different as shown in FIG. 3(a). Accordingly, when light rays 301 and 302 are refracted in crystal 307, a different refractive index is provided, thereby each light ray has a different polarizing axis. However, as light rays 301 and 302 refract through crystal 308, optical axis 308' can be adjusted in the second prism so that the two light rays advance in the same direction as shown by transmitted light ray 305 having a horizontal polarizing direction 316 with respect to the paper.

In FIG. 3(b), similar to the embodiment of FIG. 3(a), an oblique incident light ray 312 having a horizontal polarizing direction 314 with respect to the paper and a light ray 311 incident in the perpendicular direction to crystal 318 having a horizontal polarizing direction 313 with respect to the paper are transmitted towards crystal 318. As shown, light rays 311 and 312 are each directed in a different direction with respect to one another and with respect to crystal 318. Accordingly, as light rays 311 and 312 are transmitted through prism 318 each are refracted by a different refractive index in crystal 318. In this manner, each ray has a different polarizing axis. However, optical axis 317' of crystal 317 can also be adjusted similar to optical axis 308' of crystal 308 (FIG. 3(a)) so that light rays 311 and 312 advance in the same direction. Upon outputting from crystal 317, a single transmitted light ray 315 is formed having a horizontal polarizing direction 316 with respect to the paper.

Referring now to FIGS. 3 (c), (d), (e) and (f), the design of light ray combining section 202 of FIG. 2 is shown. Light ray combining section is provided with a combination of birefringent prisms and isotropic mediums. In FIG. 3 (c), an incident light ray 331 having a horizontal polarizing direction 333 with respect to the paper and an oblique incident light ray 332 having a horizontal polarizing direction 334 with respect to the paper are provided. Light rays 331 and 332 have different directions with respect to one another and with respect to crystal 337. Accordingly, each light ray is refracted by a different refractive index in crystal 337, thereby having a different polarizing axis. However, isotropic medium 338 can be adjusted so that light rays 331 and 332 may be combined to form a single transmitted light ray 335 having a horizontal polarizing direction 336 with respect to the paper.

Figure 3D:
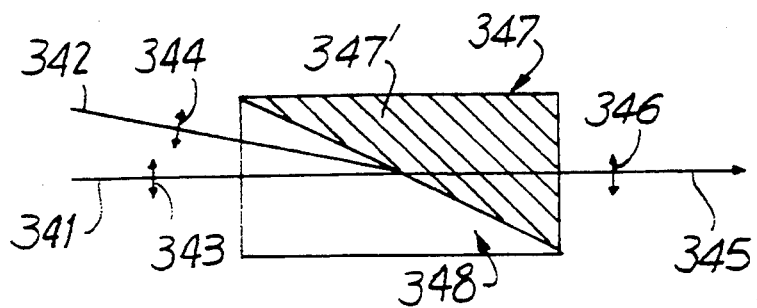
Figure 3E:
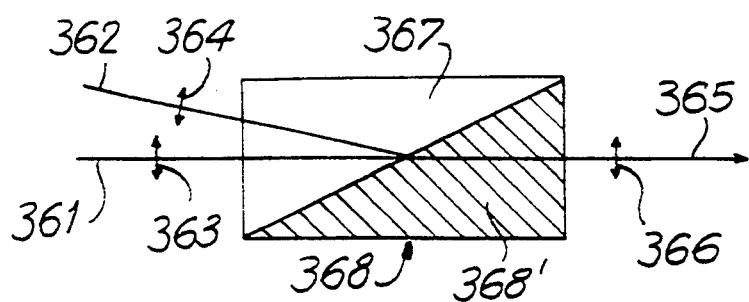

In FIG. 3(d), a light ray 341 having a horizontal polarizing direction 343 with respect to the paper and an oblique incident light ray 342 having a horizontal polarizing direction 344 with respect to the paper are provided. Each light rays 341 and 342 are transmitted in different directions with respect to one another and are received by a first prism, in this case, isotropic medium 348 in a different direction. Therefore, light rays 341 and 342 are refracted by a different refractive index in isotropic medium 348. In this manner, each light ray has a different polarizing axis. However, an optical axis 347' of crystal 347 can be adjusted such that each light ray 341 and 342 can be combined to output a single transmitted light 345 having a horizontal polarizing direction 346 with respect to the paper.

In FIG. 3 (e), a first incident light ray 361 having a horizontal polarizing direction 363 with respect to the paper and a second oblique incident light ray 362 having a horizontal polarizing direction 364 with respect to the paper are provided. Each light ray 361 and 362 have different transmitting directions with respect to one another and with respect to an isotropic medium 367. Accordingly, each light ray 361 and 362 is refracted by a different refractive index in isotropic medium 367 to form a different polarizing axis. However, as in the previous embodiments, optical axis 368' of crystal 368 may be adjusted so that the transmission of light rays 361 and 362 may be combined to form a single outputted transmitted light ray 365 having a polarizing direction 366 with respect to the paper.

Figure 3F:
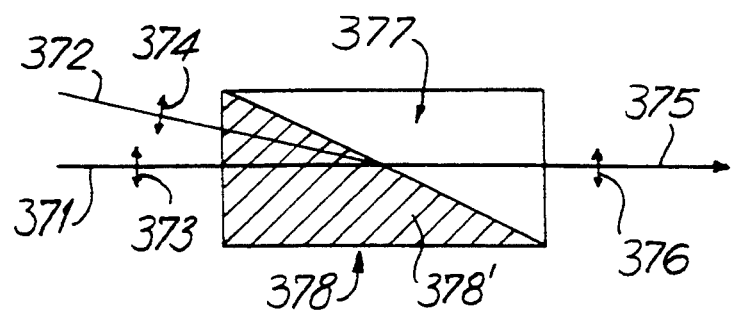

In FIG. 3(f), an incident light ray 371 having a horizontal polarizing direction 373 with respect to the paper and an oblique incident light ray 372 having a horizontal direction 374 are provided. Light rays 371 and 372 have different angles of transmission with respect to one another and with respect to crystal 378 having an optical axis 378'. Further, light rays 371 and 372 are respectively refracted in a different refractive index by optical axis 378' of crystal 378. In this manner, each light ray 371 and 372 have different polarizing axes. In order to output a single transmitted light ray 375 having a horizontal polarizing direction 376 with respect to the paper, isotropic medium 377 may be appropriately adjusted to combine light rays 371 and 372 to form single transmitted light ray 375.

Figure 1:
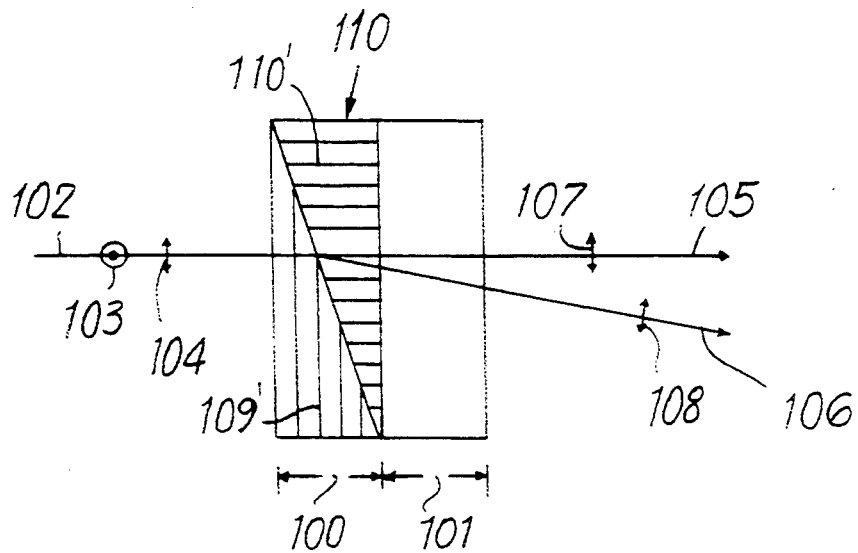
FIG. 1 is a diagrammatical representation of a preliminary polarizer in accordance with the prior art.

The prism configurations of FIGS. 3 (a) to (f) are improved designs of a polarizer compared with the design of the preliminary polarizer of FIG. 1. In this invention, the third section of the polarizer or light ray combining section 202 is developed and employed for adjusting two light rays in the same direction. The third section is required to have high transmittance, so that the transmittance after passing through the whole part of the polarizer is much higher than the conventional polarizer.

Figure 4:
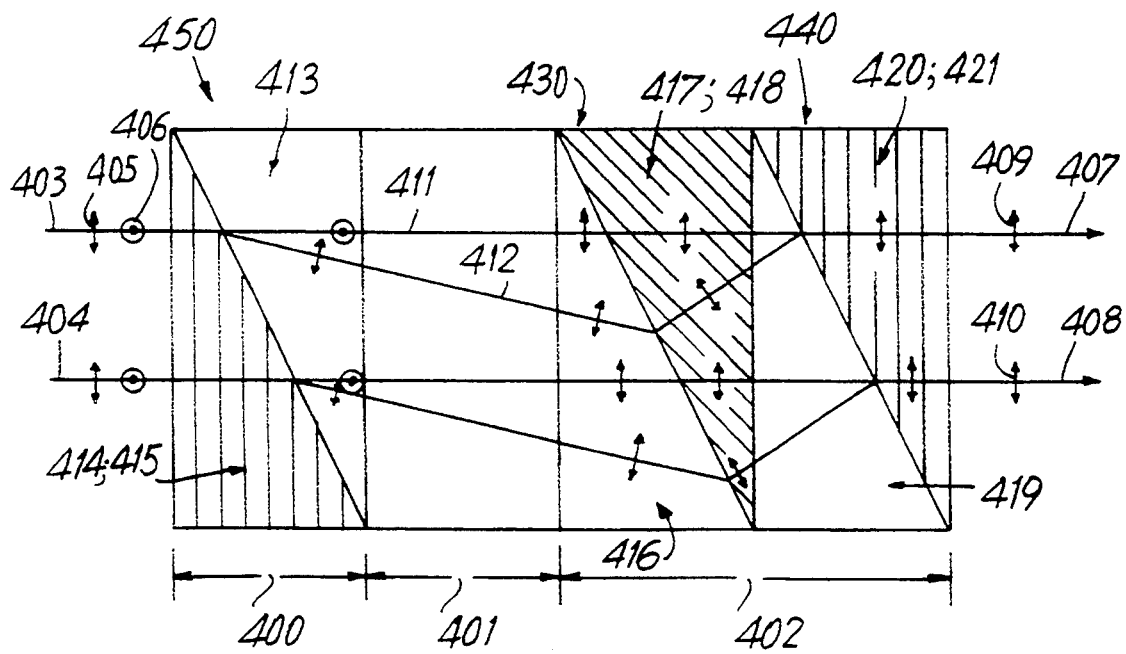
FIG. 4 is a sectional view of a polarizer in accordance with the invention.

Another structure of the invention is depicted in FIG. 4 which employs a combination of birefringent prisms. In this structure, the combination of birefringent prisms converge two divergent coherent lights. A polarizer 450 is constructed with multi-layered optical devices comprising the highly birefringent prisms. The multi-layers can be separated into three sections according to their functions. The first section is a light separating section 400 for separating the light into an ordinary ray and an extraordinary ray. The second section is a polarization rotating section 401 for rotating the extraordinary ray by 90° in the ordinary ray region. The third section is a light ray combining section 402 for combining the light rays.

In FIG. 4, two unpolarized incident light rays 403 and 404 are provided. Unpolarized incident light ray 403 has a horizontal polarizing direction 405 with respect to the paper and a perpendicular polarizing direction 406 with respect to the paper. In light separating section 400, light ray 403 is divided into two beams: first light ray 411 and a second light ray 412. Light ray 403 is divided at the interface of prism 414 and isotropic medium 413 having a refractive index of $N_{o1}$. Accordingly, first light ray 411 represents the ordinary ray, while second light ray 412 represents the extraordinary ray.

Once incident light ray 403 is divided into two rays at different angles, the two rays are rotated in polarizing rotating section 401. The two beams are then transmitted to light ray combining section 402 such that first light ray 411 and second light ray 412 are transmitted to an isotropic medium 416 having a refractive index of $N_{o3}$. Next, first light ray 411 travels through a crystal 403 having a refractive index for the ordinary ray of $N_{o3}$ such that it is transmitted along the same path. At the same time, second light ray 412 or the extraordinary ray is refracted through crystal 430 having a refractive index 417 of $N_{e3}$. The transmission of first light ray 411 and second light ray 412 continues through an isotropic medium 419 having a refractive index of $N_{o4}$. Therefore, when first light ray 411 and second light ray 412 reach the interface of the prism and isotropic medium 419, the two rays meet.

Accordingly, the two light rays form a single transmitted light ray 407 in a crystal 440 such that a refractive index 421 of the first light ray is $N_{o4}$ and a refractive index 420 of second light ray 412 is $N_{e4}$. Outputted transmitted light 407 has a horizontal polarizing direction 409 with respect to the paper. The path described for unpolarized incident light 403 can also be traced for unpolarized incident light 404 as shown in FIG. 4.

Accordingly, as shown and described above, in light ray combining section 402, second light ray 412 is deflected in the direction of the first beam. In this manner, two separate beams can be recombined into one beam. Polarizer 450 achieves notable transmittance compared with a conventional polarizer. However, when a comparison is made between the polarizer of FIG. 3 and the polarizer of FIG. 4, the polarizer disclosed in FIG. 3 is more practical considering the wavelength dependency and the complexity of the structure.

Figure 5A:
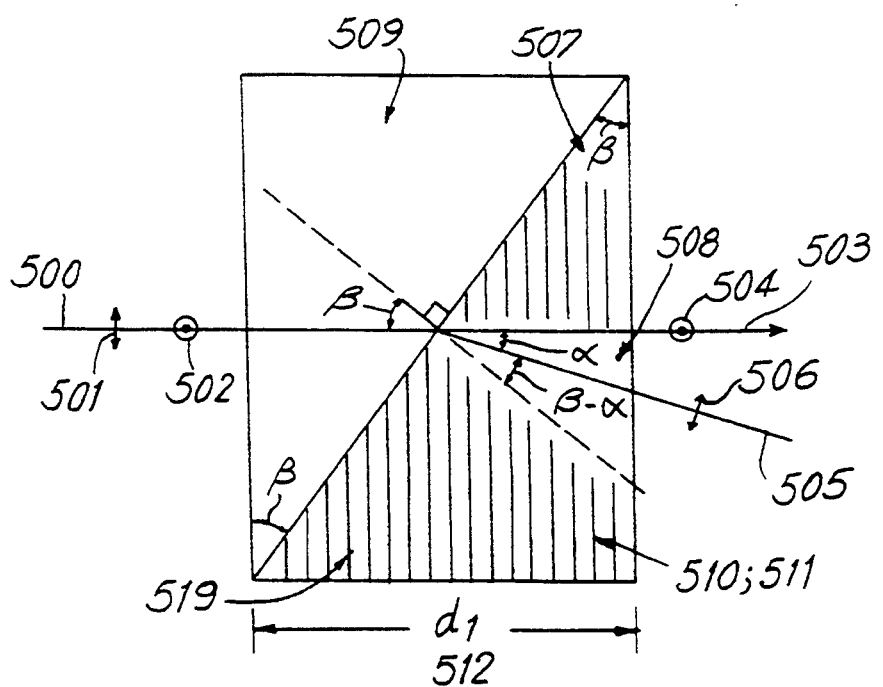
FIG. 5 (a) is a sectional view of a light separating section of a preliminary polarizer in accordance with the invention.
FIG. 5(c) is a sectional view of a light ray combining section for receiving the transmitted light from the polarization rotating section of FIG. 5(b).
Figure 5B:
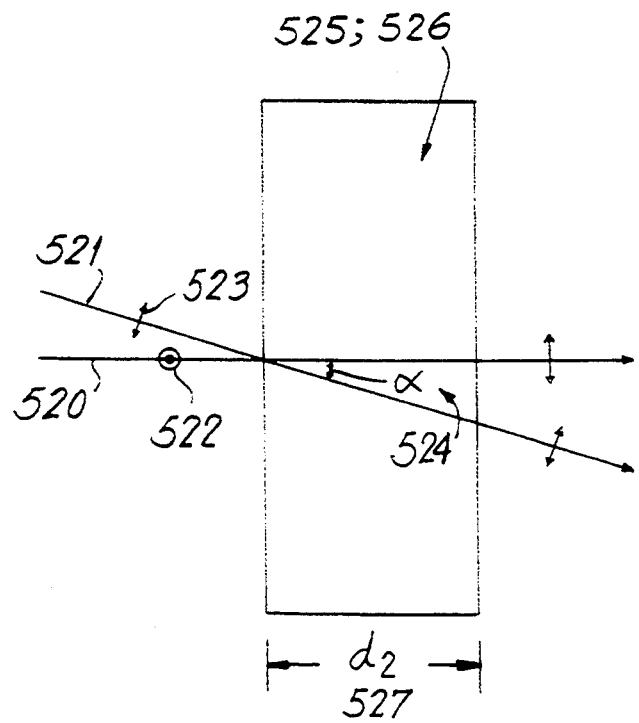
Figure 5C:
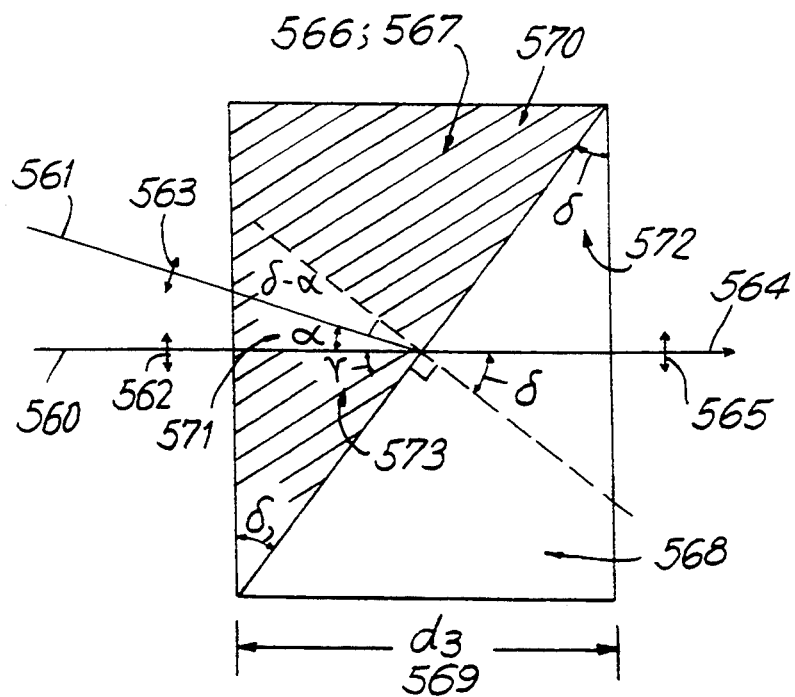

Reference is now made to FIGS. 5 (a), (b) and (c) which disclose a light separating section, a polarization rotating section and a light ray combining section, respectively. As shown in FIG. 5 (a), the light separating section comprises two edge prisms having a layer thickness 512 of $d_1$. An edge angle 507 is represented as $\beta$. The first prism is an isotropic prism 509 with a refractive index represented as $N_{o1}$. A second prism 519 is made with birefringent material wherein the refractive index of an ordinary light 510 and refractive index of an extraordinary light 511 are $N_{o1}$ and $N_{e1}$, respectively. An optical axis of the crystal is set parallel to the layer surface. An unpolarized light 500 which is incident to the normal direction is represented by the combination of two light ray components.

A first component 501 is the horizontally polarized light component with respect to the paper of FIG. 5 (a), and a second component 502 is the perpendicularly polarized light component with respect to the paper. Light 500, incident with respect to isotropic prism 509, is divided into two beams at the interface of the two edge prisms. A first beam 503 formed from second component 502 is defined as an ordinary light. The refractive index for the ordinary light is not changed at the interface of two prisms. Further, the propagation direction of the light is not changed at the interface of two prisms.

In this manner, incident light 501 is directed straight to form first beam 503. On the other hand, a second beam 505 formed from first component 501 is defined as an extraordinary light. The refractive index for the extraordinary light is changed at the interface of the two prisms and the propagation direction is deflected by angle $\alpha$ as shown by numeral 508. Therefore, incident light component 501 is bent at the interface of the two prisms and forms second beam 505.

Referring now to FIG. 5(b), polarization rotating section is shown with a thickness 527 represented as $d_2$. A first beam 520 and a second beam 521 are incident to the polarization rotating section from the light separating section at a separation angle $\alpha$ as represented by numeral 524. In order to simplify the design process, the refractive indices of the three sections (i.e., separating, rotating and combining sections) are adjusted so that the separation angle $\alpha$ is fixed. Layer thickness $d_2$ and $\Delta N$, wherein $\Delta N$ is the difference between the refractive index for the ordinary light and that for the extraordinary light, are appropriately adjusted. In this configuration, the polarization rotating section performs as a $\frac{1}{2}\lambda$plate for first beam 520, while it performs as an integer wave plate for second beam 521 which generates the phase difference an integer number of times of the wavelength. The refractive index for ordinary light 525 and extraordinary light 526 are $N_{o2}$ and $N_{e2}$, respectively.

In a light ray combining section of FIG. 5 (c), the first prism is formed of a birefringent material wherein the refractive index for ordinary light 566 and extraordinary light 567 are $N_{o3}$ and $N_{e3}$, respectively. At the same time, the second prism is formed of an isotropic material wherein the refractive index 568 is $N_L$. In this case, $\alpha$, shown as numeral 571, represents the separation angle between a first beam 560 and a second beam 561, $\delta$ represents edge angle 572, $\gamma$ represents angle 573 of the optical axis of the crystal with respect to the layer normal, and $$N_L = \frac{N_{o3}N_{e3}}{\sqrt{N_{e3}^2\cos^2\alpha + N_{o3}^2\sin^2\alpha}}.$$

To design the polarizer in accordance with the invention, design values are calculated in the following order: (1) the polarization rotating section, (2) the light separating section and (3) the light ray combining section. First, the polarization rotating section will be discussed. As shown in FIG. 5 (b), the polarization rotating section performs as a $\frac{1}{2}\lambda$plate for the first beam, while it performs as an integer wave plate for the second beam. The following relations are obtained in consideration of the optical path length of each beam:

$$\Delta N d_2 = (M + \tfrac{1}{2})\lambda: \text{ the first beam} \quad (1)$$

$$\Delta N d_2 = M\lambda: \text{ the second beam} \quad (2)$$

wherein $\Delta N$ represents the difference between the refractive index for the extraordinary light and the refractive index for the ordinary light, $d_2$ represents the thickness of the layer, M represents a positive integer, and $\lambda$ represents the wavelength.

In the above equation, each factor (i.e., $\Delta N$, $\lambda$, and N) is fixed such that $\Delta N = 0.3$, $\lambda = 0.5$ $\mu$m, and $N = 1000$. Therefore, the following values are obtained:

$$d_2 \approx 1.677 \text{ mm}$$

$$\alpha = \cos^{-1}[M/(M+\tfrac{1}{2})] \approx 0.0316161.$$

The calculation for the light separating section in FIG. 5(a) is discussed below. The edge angle $\beta$ is determined according to Snell's law under the condition that $\alpha = 0.0316161$, $N_{o1} = 1.4$, $N_{e1} = 1.7$, $$N_{o1}\sin(B) = N_{eff}\sin(B - \alpha), \text{ wherein}$$

$$N_{eff} = \frac{N_{o1}N_{e1}}{\sqrt{N_{e1}^2\cos^2\frac{\pi}{2} - \alpha + N_{o1}^2\sin^2\frac{\pi}{2} - \alpha}} = 1.699597.$$

As a result of this calculation, the following values are obtained:

$$\beta \approx 0.1779348$$

$$\tan(\beta) \approx 0.1798367$$

The practical condition for designing the prism is with a width of 100$\mu$m and a thickness $d_2 \approx 18.0\mu$m.

Finally, the calculation for the light ray combining section is set forth below. In FIG. 5 (c), the values of $\delta$ and $\gamma$ are obtained with respect to the second beam under the condition that the refractive index for the ordinary light $N_{o3} = 1.3$, the refractive index for the extraordinary light $N_{e3} = 1.7$, and $\alpha = 0.0316161$.

Therefore, the following relation is obtained according to Snell's law:

$$N_L\sin(\delta) = N_{eff}\sin(\delta - \alpha), \text{ wherein}$$

$$N_L = \frac{N_{o3}N_{e3}}{\sqrt{N_{e3}^2\cos^2\gamma + N_{o3}^2\sin^2\gamma}} = 1.494810.$$

$$N_{eff} = \frac{N_{o3}N_{e3}}{\sqrt{N_{e3}^2\cos^2(\delta + \gamma) + N_{o3}^2\sin^2(\delta + \gamma)}} = 1.443235.$$

The obtained optimum values are $\delta \approx 75° \pm 1°$ and $\gamma \approx 50° \cong \pm 5°$. Accordingly, the light ray combining section has a thickness of 100 $\mu$m and a width of $d_3 \approx 373$ $\mu$m. From the above result, the thickness of the preliminary polarizer d is as follows:

$$\begin{aligned} d &= d_1 + d_2 + d_3 \\ &\approx 18.0 \ \mu\text{m} + 1.667 \text{ mm} + 373 \ \mu\text{m} \\ &\approx 2 \text{ mm}. \end{aligned}$$

In accordance with this calculation, the preliminary polarizer is an extremely thin sheet.

The light ray combining section of the polarizer of this invention is applicable for many practical uses. The light ray combining section can be used not only as a part of a preliminary polarizer, but also be used alone as an optical device in laser optics. In a laser light, which has high directivity and monochromaticity, a combination device can be achieved by driving two diverged laser light beams into the same direction. Further, the polarizer of this invention has the utility for interferometry, optical information processing, integrated optics, fiber optics, and the like. In fact, as shown in FIG. 4, the accurately designed light ray combining section can be designed to be similar to a real polarizer.

Accordingly, a prism optical device is provided with birefringent edge prisms and isotropic edge prisms. The refractive index of each prism is adjusted so that an angle formed with two unparallel incident lights differs from an angle formed with two output lights. Therefore, the two unparallel incident lights and two output lights travel on the plane surface which is vertical with respect to the interface between the edge prisms. Further, the angle formed with two output lights which travel on the plane surface is 0°.

The unparallel incident lights are linearly polarized lights which generate electric field component in the plane surface. In an alternative embodiment, the unparallel incident lights are elliptically polarized lights in the plane surface. In another embodiment, the unparallel incident lights are circularly polarized lights in the plane surface.

The polarizer optical device may be design with three distinct components. First, a light separating section is provided for separating a light into two polarization components which are orthogonal to each other. Second, a polarization rotating section is provided wherein the phase difference between the two polarization components orthogonal to each other is $\frac{1}{2}\lambda$. Finally, a light combining section is provided with a prism optical device.

The advantages of the polarizer of the invention can be summarized as follows. Light energy can be economized. Since this type of preliminary polarizer is formed of transparent isotropic material and birefringent material, the absorption of light energy is small and therefore can be ignored. Moreover, the inter-layer refractive index is appropriately adjusted in the designing process, so that the reflective coefficient is very small.

In comparison to the conventional dichroic polarizer, this polarizer is suitable with a higher-power light source. Since the polarizer of this invention has a low absorption coefficient, the amount of absorbed light energy is not great. Therefore, the preliminary polarizer is not effected by the heat. Finally, transmittance can be improved compared with the conventional polarizer. If the preliminary polarizer of this invention is arranged in front of the conventional polarizer, the total transmittance is improved comparing with the case without the subject preliminary polarizer.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A polarizing device for receiving and outputting light, comprising:

a light ray separating section having a prism optical assembly including a first right-angle edge prism and a second right-angle edge prism, said first right-angle prism having isotropic optical characteristics and having a predetermined refractive index $N_{o1}$, and said second right-angle edge prism having uni-axial birefringence and having a predetermined refractive index $N_{o1}$ with respect to an ordinary ray and a refractive index $N_{e1}$ with respect to an extraordinary ray, said hypotenuse of said first and second right-angle edge prisms making contact with one another to from an interface plane, said prism optical assembly having a receiving side on said first right-angle edge prism, said receiving side being a light ray incident surface, an outputting side opposite said receiving side on said second right-angle edge prism, said outputting side being a light ray emitting surface, said second right-angle edge prism having an optical axis parallel to said light ray incident surface, a first side between said outputting side and said receiving side and essentially perpendicular to said receiving side and said outputting side, and a second side opposite said first side, said first and second sides being perpendicular to said interface plane, the light incident to said light ray separating section being separated into a first light ray and a second light ray;

a polarizing rotation section made of a birefringence material having a first side and a second side opposite said first side and essentially parallel thereto, said second side being a light emitting section, said first side of said polarizing rotation section substantially contacting said outputting side of said light ray separating section, the optical axis of said polarizing rotation section being parallel to said light ray incident surface and said light ray emitting surface of said light ray separating section and being twisted with respect to the optical axis of said second right-angle edge prism of said light ray separating section; and a light ray combining section including a third right-angle edge prism having uni-axial birefringence and a fourth right-angle edge prism having isotropic optical characteristics, said hypotenuse of said third and fourth right-angle edge prisms making contact with one another to from an interface plane, said third right-angle edge prism substantially contacting said second side of said polarizing rotation section, said third right-angle edge prism having an optical axis arranged within a plane that includes the optical axis of said second right-angle edge prism of said light ray separating section;

said light ray separating section, said polarizing rotation section and said light ray combining section being arranged such that a light having a first polarized light component and a second polarized component oscillating perpendicularly to the first polarized component impinges upon said receiving side of said light ray separating section, transmits through said first and second right-angle edge prisms and emits through said outputting side of said light ray separating section in two components to said polarizing rotation section, while maintaining their propagation direction, a first light ray derived from said first polarized light component and a second light ray derived from said second polarized light component, said first and second rays impinge upon said first side of said polarizing rotation section, said polarizing rotation section rotates said first ray 90° and emits said first and second light rays from said polarizing rotation section to impinge upon said third right-angle edge prism while keeping their propagation directions and then made incident to said fourth right-angle edge prism so as to emit therefrom as light rays having the same direction of polarization.

2. The polarizing device of claim 1, wherein the optical axis of said second right-angle edge prism of said light ray separating section is not perpendicular to a line normal to the light incident surface of said light ray separating section.

3. A polarizing optical device of claim 2, wherein said light ray separating section, said polarizing rotation section and said light ray combining section are arranged on a common plane to form a sheet-like structure in which said sections are substantially aligned.

4. The polarizing optical device of claim 2, wherein the optical axis of said polarizing rotation section is not in the plane including the optical axis of said second right-angle edge prism of said light ray separating section.

5. A polarizing optical device of claim 4, wherein said light ray separating section, said polarizing rotation section and said light ray combining section are arranged on a common plane to form a sheet-like structure in which said sections are substantially aligned.

6. The polarizing optical device of claim 1, wherein the optical axis of said polarizing rotation section is not in the plane including the optical axis of said second right-angle edge prism of said light ray separating section.

7. A polarizing optical device of claim 1, wherein said light ray separating section, said polarizing rotation section and said light ray combining section are arranged on a common plane to form a sheet-like structure in which said sections are substantially aligned.

* * * * *